United States Patent
Reece et al.

(10) Patent No.: US 10,402,533 B1
(45) Date of Patent: Sep. 3, 2019

(54) PLACEMENT OF CELLS IN A MULTI-LEVEL ROUTING TREE

(71) Applicant: Cadence Design Systems, Inc., San Jose, CA (US)

(72) Inventors: William Robert Reece, Over (GB); Yi-Xiao Ding, Austin, TX (US); Thomas Andrew Newton, Great Cambourne (GB); Charles Jay Alpert, Cedar Park, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 35 days.

(21) Appl. No.: 15/691,631

(22) Filed: Aug. 30, 2017

(51) Int. Cl.
 *G06F 17/50* (2006.01)
(52) U.S. Cl.
 CPC ...... *G06F 17/5081* (2013.01); *G06F 17/5077* (2013.01)
(58) Field of Classification Search
 CPC .................. G06F 17/5081; G06F 17/5077
 See application file for complete search history.

(56) References Cited

U.S. PATENT DOCUMENTS

| | | | | |
|---|---|---|---|---|
| 6,895,569 | B1 * | 5/2005 | Teig | G06F 17/5068 716/129 |
| 8,332,793 | B2 * | 12/2012 | Bose | G06F 17/5068 716/108 |
| 9,177,096 | B2 * | 11/2015 | Sundareswaran | G06F 17/5081 |

* cited by examiner

*Primary Examiner* — Vuthe Siek
(74) *Attorney, Agent, or Firm* — Schwegman Lundberg & Woessner, P.A.

(57) ABSTRACT

Systems, methods, media, and other such embodiments are described for placement of cells in a multi-level routing tree, where placement of a mid-level parent node between a grandparent node and a set of child nodes is not set. One embodiment involves generating a first routing subregion between a first set of child nodes associated with a first grandparent node and a first connecting route from the first routing subregion to the first grandparent node, which together are set as a first routing region comprising the first routing subregion and the first connecting route. Sampling points are selected along the first routing region, and for each sampling point a set of operating values associated with the sampling point is calculated. A position for the parent node is selected based on the operating values for the sampling points.

20 Claims, 13 Drawing Sheets

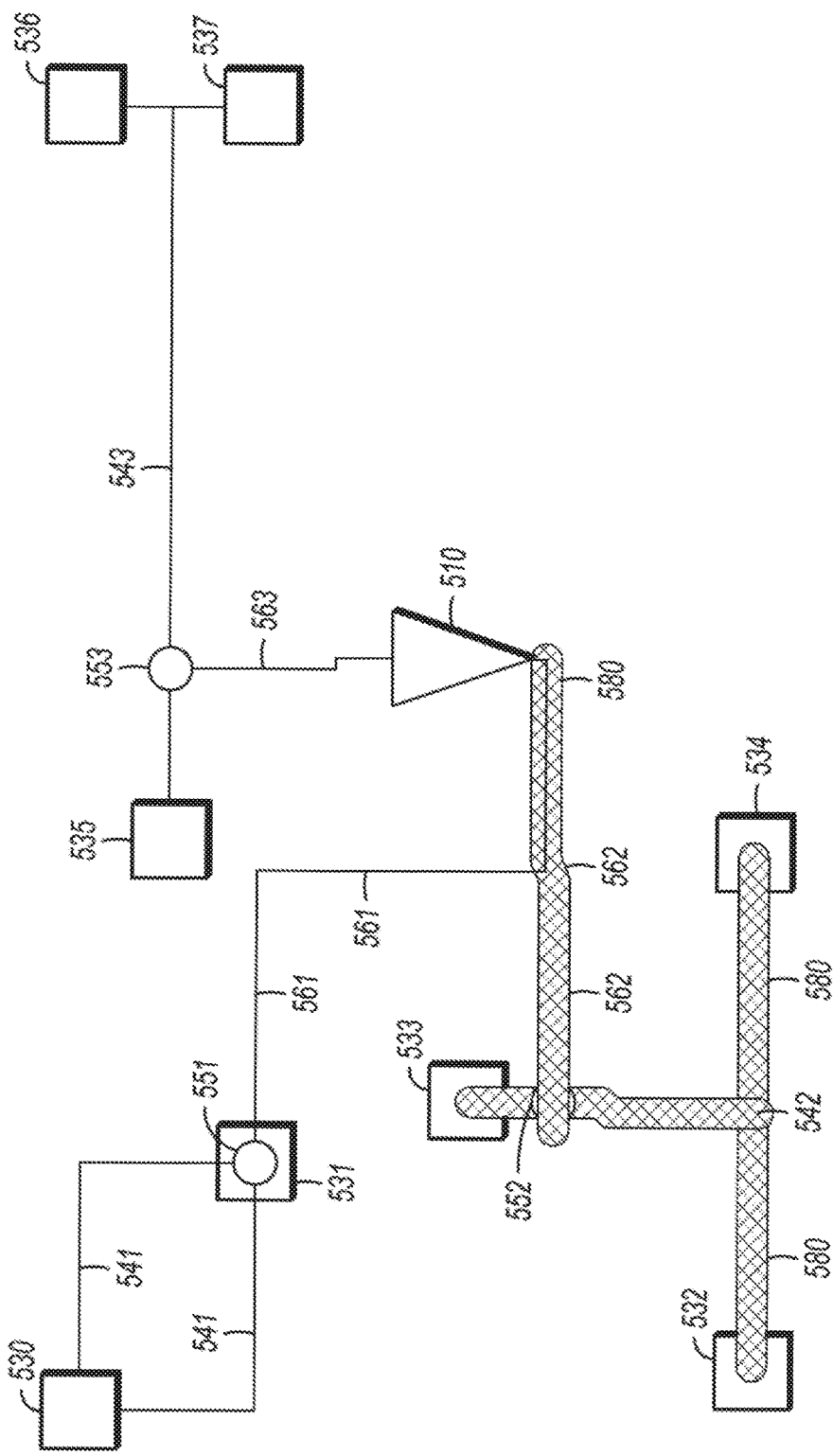

PLACEMENT OF CELLS IN A MULTI-LEVEL ROUTING TREE

TECHNICAL FIELD

Embodiments described herein relate to electronic design automation (EDA), and to systems, methods, devices, and instructions for generating circuit designs, including generating or updating placement of cells in a multi-level routing tree.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Automated design of routing connections between or among individual circuit elements or design blocks is also part of such EDA system operations. Schematic and layout information for such block portions of a design may be exchanged or licensed as intellectual property. Timing analysis is an EDA verification analysis whereby the timing of circuit elements and/or circuit blocks is analyzed to verify that the design meets constraints in order to operate at intended clock rates in an expected operating environment.

BRIEF DESCRIPTION OF THE DRAWINGS

Various ones of the appended drawings merely illustrate example embodiments of the present disclosure and should not be considered as limiting its scope.

FIG. 5B illustrates aspects of cell placement in a multi-level routing tree in accordance with some embodiments.

DETAILED DESCRIPTION

Embodiments described herein relate to electronic design automation (EDA) and to methods, computer media, and devices used for analyzing, optimizing, and creating electronic circuits. One of the many complex elements of circuit design is the generation of routing trees that convey a signal from a signal origin, or source, to a signal destination, or sink. A clock tree, for example, may have a single source, with hundreds or thousands of destination sinks. Similarly, power may be routed to different circuit elements via routing trees or routing networks.

When selecting locations for logic cells, macro pins, or other such nodes for an integrated circuit design, a solution is needed that satisfies all design rule constraints, preserves logical connectivity, and limits the physical resources (e.g., total wire capacitance) used in connecting the cells (e.g., nodes). Some systems identify solutions using an undirected algorithm to test node placement, but such undirected algorithms may be prohibitively expensive in terms of computing resources (e.g., memory and processor cycles).

Embodiments described herein leverage routing algorithms to identify connections between node placement points, which are then further used to identify a limited number of possible cell locations which can then be evaluated to verify that they meet design rule constraints.

Figure 1:
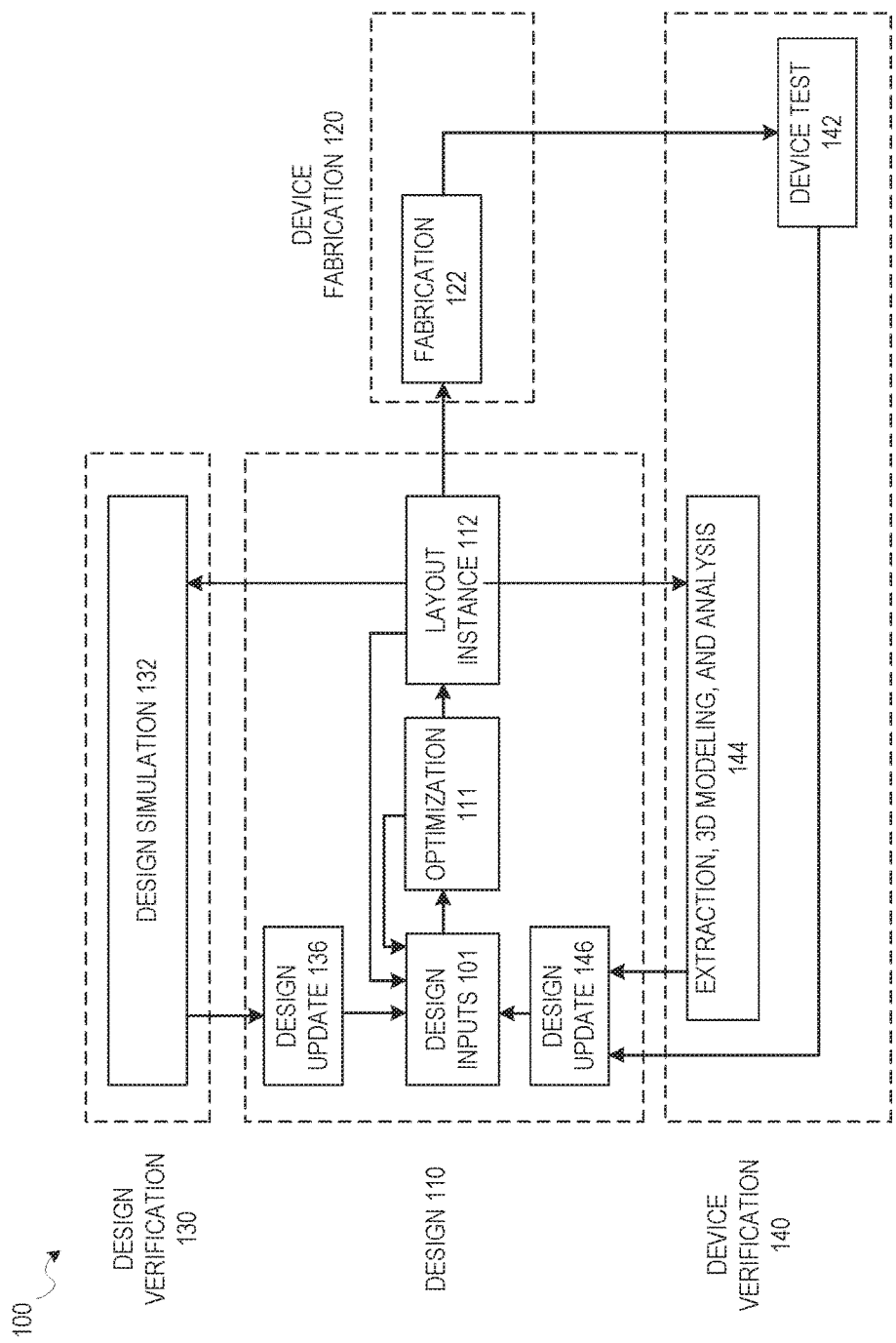
FIG. 1 is a diagram illustrating one possible design process flow which includes elements for cell placement in a multi-level routing tree in accordance with some embodiments.

FIG. 1 is a diagram illustrating one possible design flow 100 which includes elements that involve placement of logic cells in accordance with embodiments described herein. It will be apparent that other design flow operations may function using the timing constraints and optimizations described herein, but the design flow 100 is described here for the purposes of illustration.

As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial logic of circuit elements requiring routing structures to connect them is generated, before adjustments are made to improve a design according to various criteria (e.g., wire length, wire capacitance, power usage, skew, slew rates, etc.). In various embodiments, placement of cells in a multi-tier routing tree and adjustments to a routing may be made at any time during generation of a circuit design. The initial strategy, tactics, and context for the device to be created are also generated in the design input operation 101, depending on the particular design algorithm to be used.

In some embodiments, following an initial selection of design values in the design input operation 101, updates to an initial routing structure may be generated during an optimization operation 111 or a layout instance 112, along with any other automated design processes. As described below, design constraints (e.g., blocking elements, timing limits, etc.) for a cell placement and routing may be provided with design inputs in the design input operation 101, and then may be analyzed according to various embodiments described below.

While the design flow 100 shows such optimization occurring prior to the layout instance 112, updates to cell placement and the associated routing structure may be performed at any time to improve expected operation of a circuit design. For example, in various embodiments, constraints for blocks in a circuit design may be generated or updated prior to routing of connections in the circuit design, after routing, during register transfer level (RTL) operations, or as part of a final signoff optimization or verification prior to a device fabrication operation 122. In response to such updates, changes may be made to cell placement and associated routing structures. Certain embodiments of operations described herein for generating and updating cell placement and associated routing structures for a circuit design may therefore involve iterations of the design input operation 101, optimization operation 111, and layout instance 112 generation. In other systems, other design processes may be used.

After design inputs are used in the design input operation 101 to generate a circuit, and any optimization operations 111 are performed, a layout is generated in the layout instance 112. The layout describes the physical layout dimensions of the device that match the design inputs. In accordance with embodiments described herein, the layout places circuit elements in a physical space while maintaining the logical ordering of the elements (e.g., parent-child ordering in a routing tree). Embodiments described herein are used to select placement positions for cells (e.g., nodes) of a circuit design. This layout may then be used in a device fabrication operation 122 to generate a mask associated with device fabrication and generate a physical device. Alternatively, additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

Design updates 136 from design simulation 132 operations; design updates 146 from device test 142 or extraction, 3D modeling, and analysis 144 operations; or a direct design input operation 101 may occur after an initial layout instance 112 is generated. In various embodiments, whenever design inputs are used to update or change an aspect of a circuit design, a timing analysis and optimization operation 111 may be performed, and associated modifications to the design made (e.g., including modifications to cell placement which may involve updates to associated grandparent or child cells).

Routing trees in a circuit design as described herein may have many different levels, with an initial node connected to one or more nodes, which are further connected to additional nodes. Embodiments described herein break such multi-level systems into subgraphs having three levels of logical connectivity. These may be referred to as parent, child, and grandchild levels, or grandparent, parent, and child levels, with the nodes in these levels discussed by their relationship to connected nodes. These refer to the logical ordering, with "older" nodes proceeding to "younger" nodes (e.g., grandparent to parent, parent to child, child to grandchild).

Figure 2:
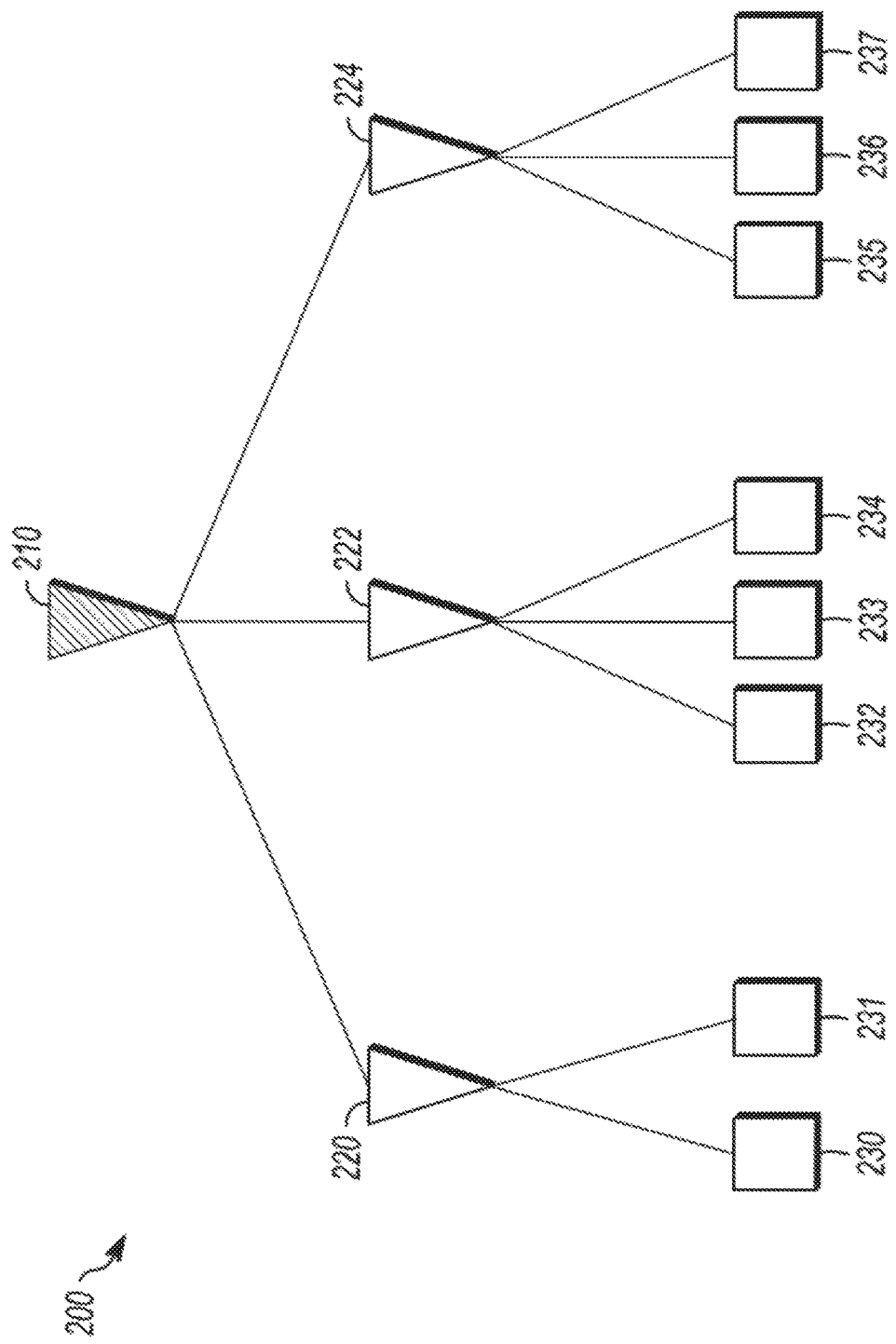
FIG. 2 illustrates aspects of cells in a multi-level routing tree in accordance with some embodiments.

FIG. 2 illustrates aspects of cells in a multi-level routing tree in accordance with some embodiments. FIG. 2 shows a directed acyclic subgraph 200 representing a portion of a circuit design. Within the subgraph 200 are a plurality of nodes, with each node representing a gate or macro pin, and each line (e.g., edge) between nodes representing a route. The circuit design associated with the subgraph 200 has logical relationships between nodes, but is not necessarily associated with a specific layout and node placement in a physical design layout for the circuit design. The overall circuit design may have many more logical connections and nodes than those shown, but in various embodiments, portions of a design are extracted and processed by breaking a circuit design into overlapping subgraphs and processing each subgraph portion of the circuit design.

FIG. 2 shows a grandparent node 210, parent nodes 220, 222, and 224, and child nodes 230-237. The connections between these nodes represent the logical flow and organization of the portion of the circuit design represented by the subgraph 200. For example, the parent node 220 has logical connections to the grandparent node 210 and the set of child nodes including the child nodes 230 and 231. During layout, the position of each of these nodes may vary, but within the circuit design, the logical connections along wire routes between these nodes remains unchanged. Additionally, while these nodes are referred to by "grandparent," "parent," and "child" identifiers, these titles are relative within the subgraph 200. In the larger circuit design, the grandparent node 210 may be a child node to other parent and grandparent nodes that are not shown. Similarly, any of the child nodes 230-237 may be grandparent nodes to other nodes "below" them on the graph. As discussed herein, nodes "above" a node in a design refer to nodes closer to a signal source, and nodes "below" a node refer to nodes closer to a final sink in a route. A "parent" or "grandparent" node is above the related "child" node, and a "child" or "grandchild" node is below an associated "parent" or "grandparent" node.

In one embodiment, the subgraph 200 of FIG. 2 represents design data that is accessed or extracted from a circuit design. This design data includes a plurality of child nodes, one or more parent nodes, and one or more grandparent nodes. The design data also includes layout placement data (e.g., positions on a layout grid of a circuit design for the physical cells/elements/nodes represented in the circuit design) for the child nodes and the grandparent nodes. The parent nodes may have associated placement data, but the placement data is not set, and new placement or adjustment of the placement data may be considered as part of various embodiments.

Additionally, within the design data, child nodes that are directly associated with the same parent are considered sibling nodes that are part of a set of child nodes. For example, in the subgraph 200, three sets of child nodes are present. A first set of child nodes including the child nodes 230 and 231 is associated with the parent node 220. A second set of child nodes including the child nodes 232, 233, and 234 is associated with the parent node 222, and a third set of child nodes including the child nodes 235, 236, and 237 is associated with the parent node 224. As described below, each of these sets of child nodes will be considered separately to identify appropriate position placement for the associated parent node.

Figure 3:
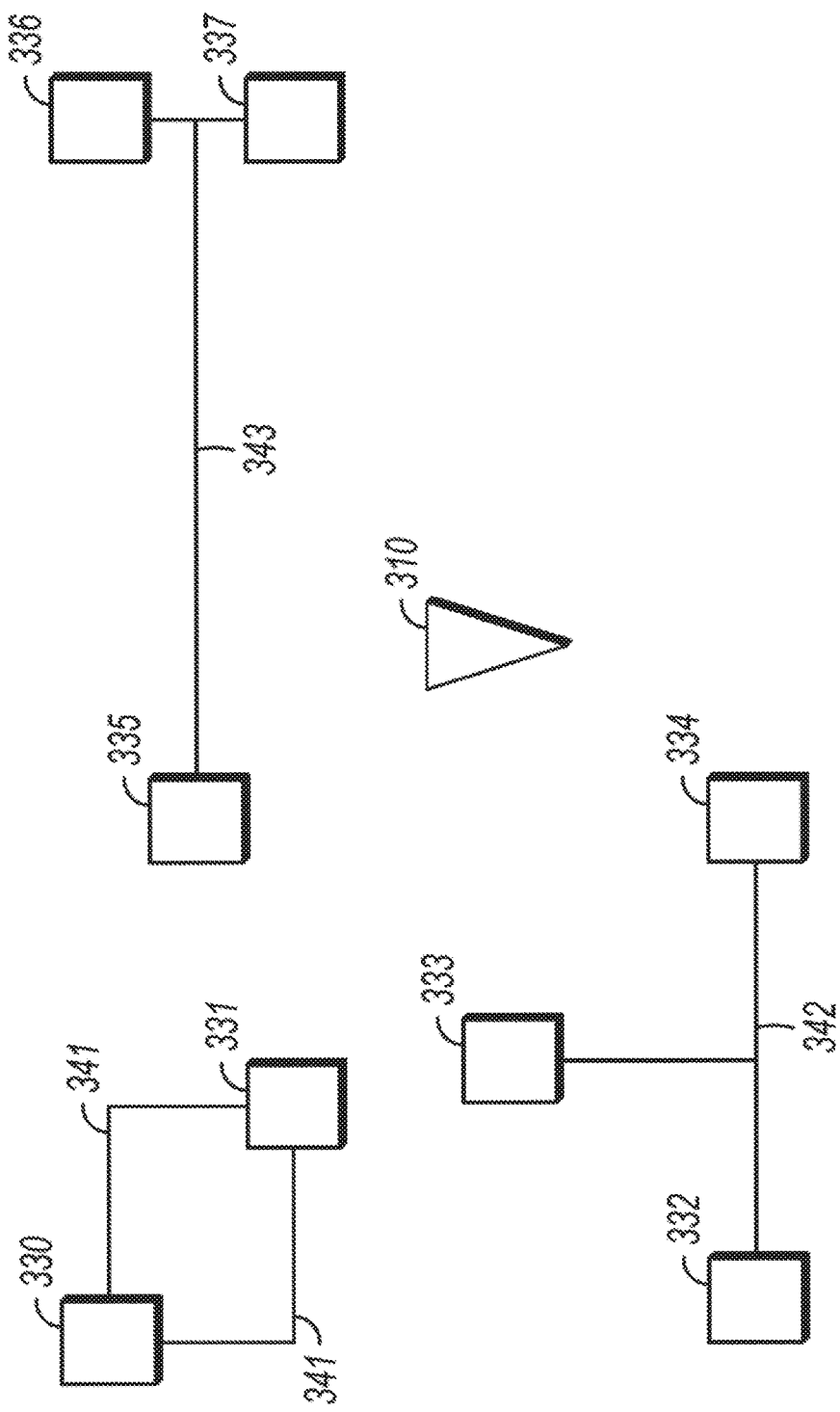
FIG. 3 illustrates aspects of cell placement in a multi-level routing tree in accordance with some embodiments.

FIG. 3 illustrates aspects of cell placement in a multi-level routing tree in accordance with some embodiments. FIG. 3 represents placement of child nodes and a grandparent node in a placement grid for a circuit design. In some embodiments, the child, parent, and grandparent nodes of FIG. 3 may correspond to the similar nodes of FIG. 2, such that the child nodes 231-237 and grandparent node 210 of FIG. 2 correspond to child nodes 331-337 and a grandparent node 310 of FIG. 3. Each set of the three sets of child nodes is associated with a parent node, which is not shown, as the parent node does not have a set placement position in the layout.

In accordance with various embodiments, once the design data including the placement positions of the child nodes and the grandparent node is accessed, along with the logical relationships identifying these nodes as child or grandparent nodes, routing subregions are generated for each set of child nodes. The routing subregions connect the child nodes with routing paths. FIG. 3 shows a routing subregion 341 associated with the child nodes 330 and 331, a routing subregion 342 associated with the child nodes 332-334, and a routing subregion 343 associated with the child nodes 335-337. In various embodiments, these subregions may be generated in different ways. In some embodiments, Manhattan routing is used for placing routing lines within a routing grid to minimize wire length. In other embodiments, other routing algorithms may be used. In some embodiments, Prim-Dijkstra routes are used to connect sets of child nodes with minimal routing resources. In some embodiments, portions of the layout may be blocked by other circuit elements that are not part of the portion of the circuit design being considered, and the routing subregion may account for such blockages. In some embodiments, there may be multiple equivalent paths for connections between child nodes (e.g., an L-shaped routing segment can be rotated by 180 degrees to provide an equivalent route between certain nodes). For example, the routing subregion 341 shows two paths between the child nodes 330 and 331. A final layout will only have a single routing path between these nodes, but both paths are considered as part of the routing subregion 341 in accordance with various embodiments. In other embodiments, other characteristics of the different routes may be considered to exclude one of these routes from the routing subregion that is used for sampling potential parent node locations, as detailed below. Once these routing subregions are identified, they are connected to the grandparent node as detailed below.

Figure 4:
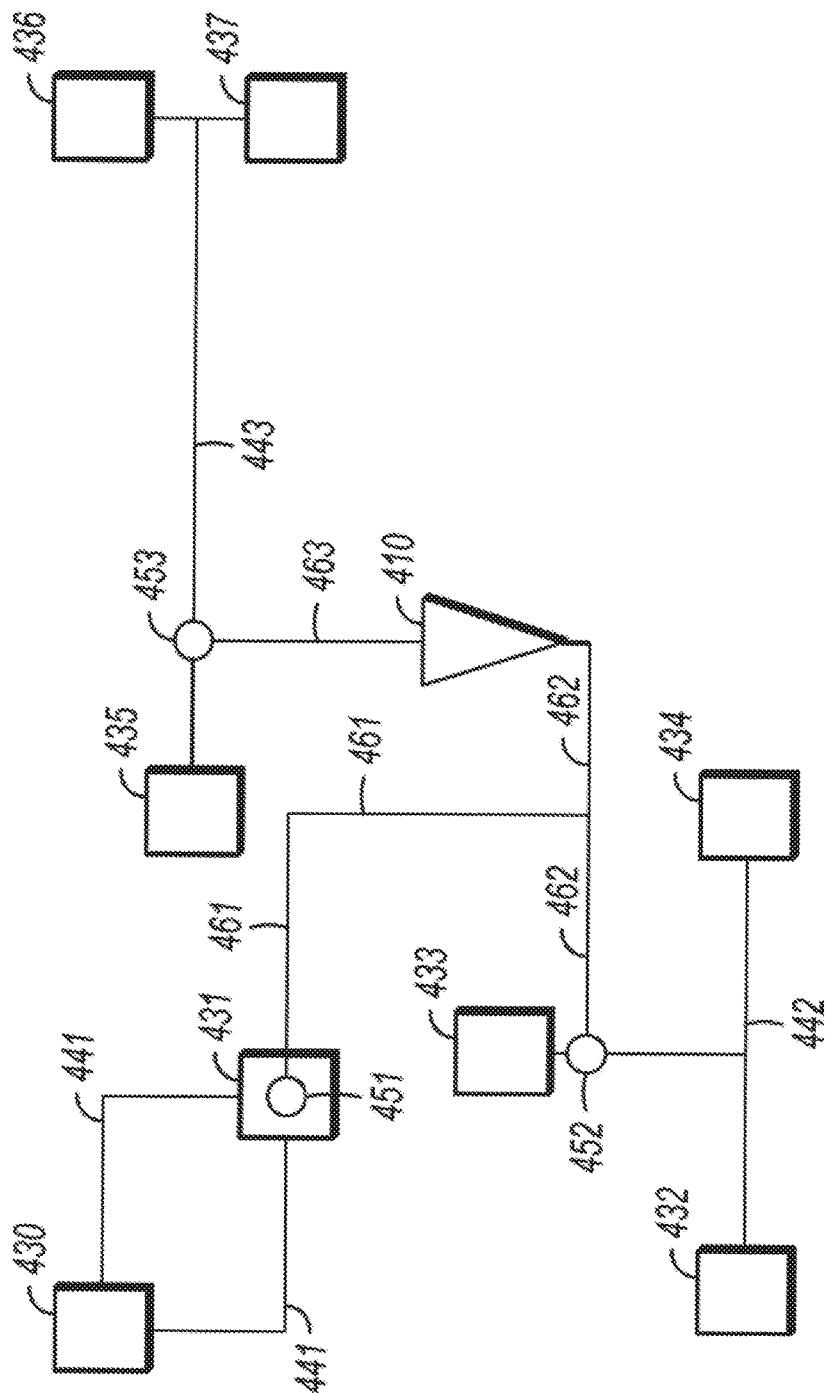
FIG. 4 illustrates aspects of cell placement in a multi-level routing tree in accordance with some embodiments.

FIG. 4 illustrates aspects of cell placement in a multi-level routing tree in accordance with some embodiments. FIG. 4 shows routing subregions connected to a grandparent node. Just as above, the elements of FIG. 4 may, in some embodiments, correspond to similar elements of FIGS. 2 and 3. FIG. 4 includes child nodes 430-437 and a grandparent node 410, as well as routing subregions 441, 442, and 443, similar to the elements above. In addition, FIG. 4 includes connecting points 451, 452, and 453 and connecting routes 461, 462, and 463.

After the routing subregions 441, 442, and 443 are determined, the connecting routes 461, 462, and 463 are generated to connect the routing subregions to the grandparent node 410. Just as above for generation of the routing subregions, the connecting routes may be generated in a variety of ways. In one embodiment, the connecting routes are generated by identifying the connecting points 451, 452, and 453 on the corresponding routing subregions 441, 442, and 443 that are closest (e.g., connectable via the shortest wire) to the grandparent node 410. Routings from the connecting points 451, 452, and 453 to the grandparent node 410 are then generated as connecting routes 461, 462, 463. This is repeated for each set of child nodes to connect each routing subregion to the grandparent node. The combination of the routing subregion and the connecting route from the subregion to the grandparent node is then used as a sampling space to select a position for the parent node associated with each set of child nodes.

Figure 5A:
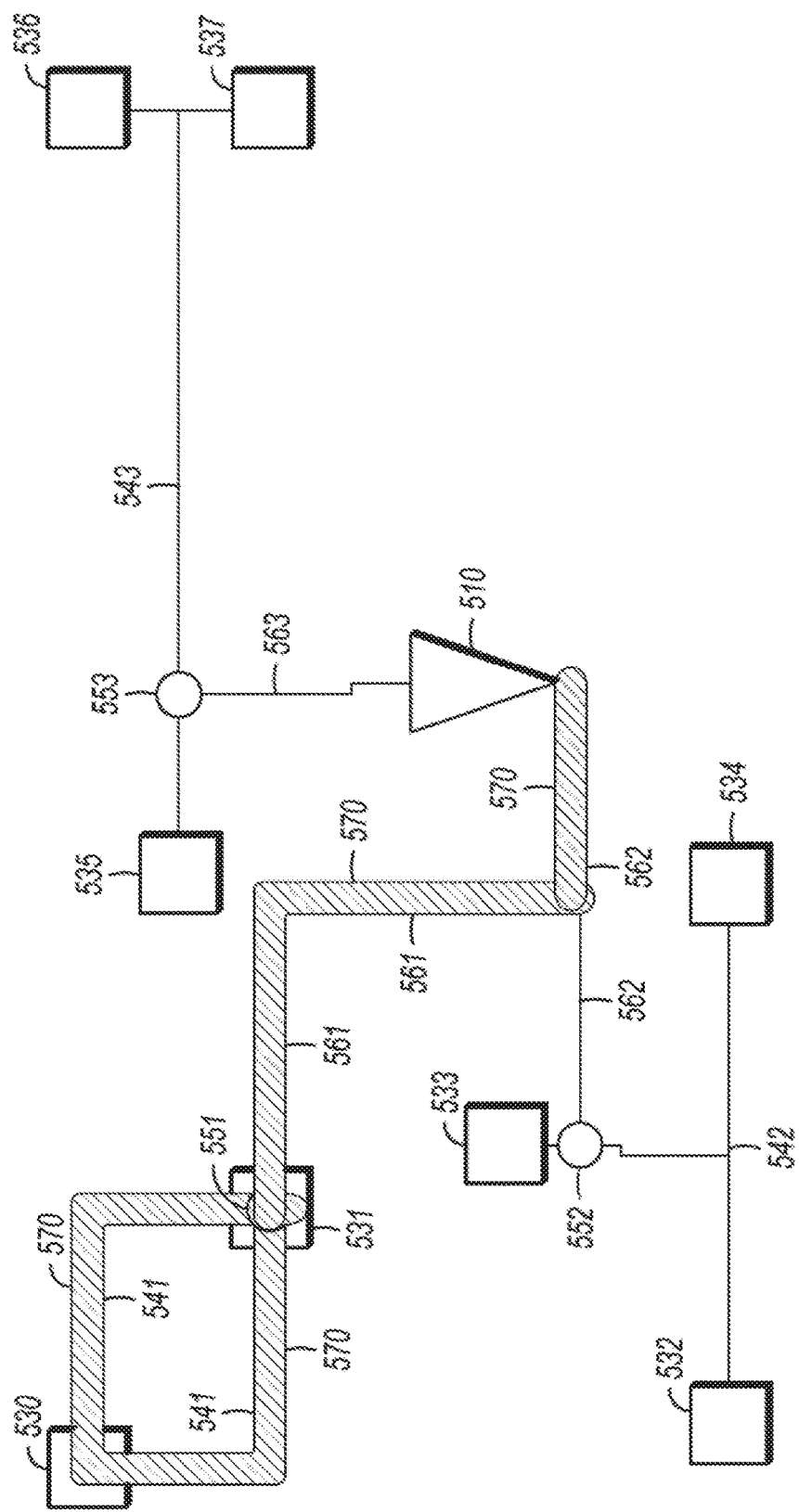
FIG. 5A illustrates aspects of cell placement in a multi-level routing tree in accordance with some embodiments.
Figure 5C:
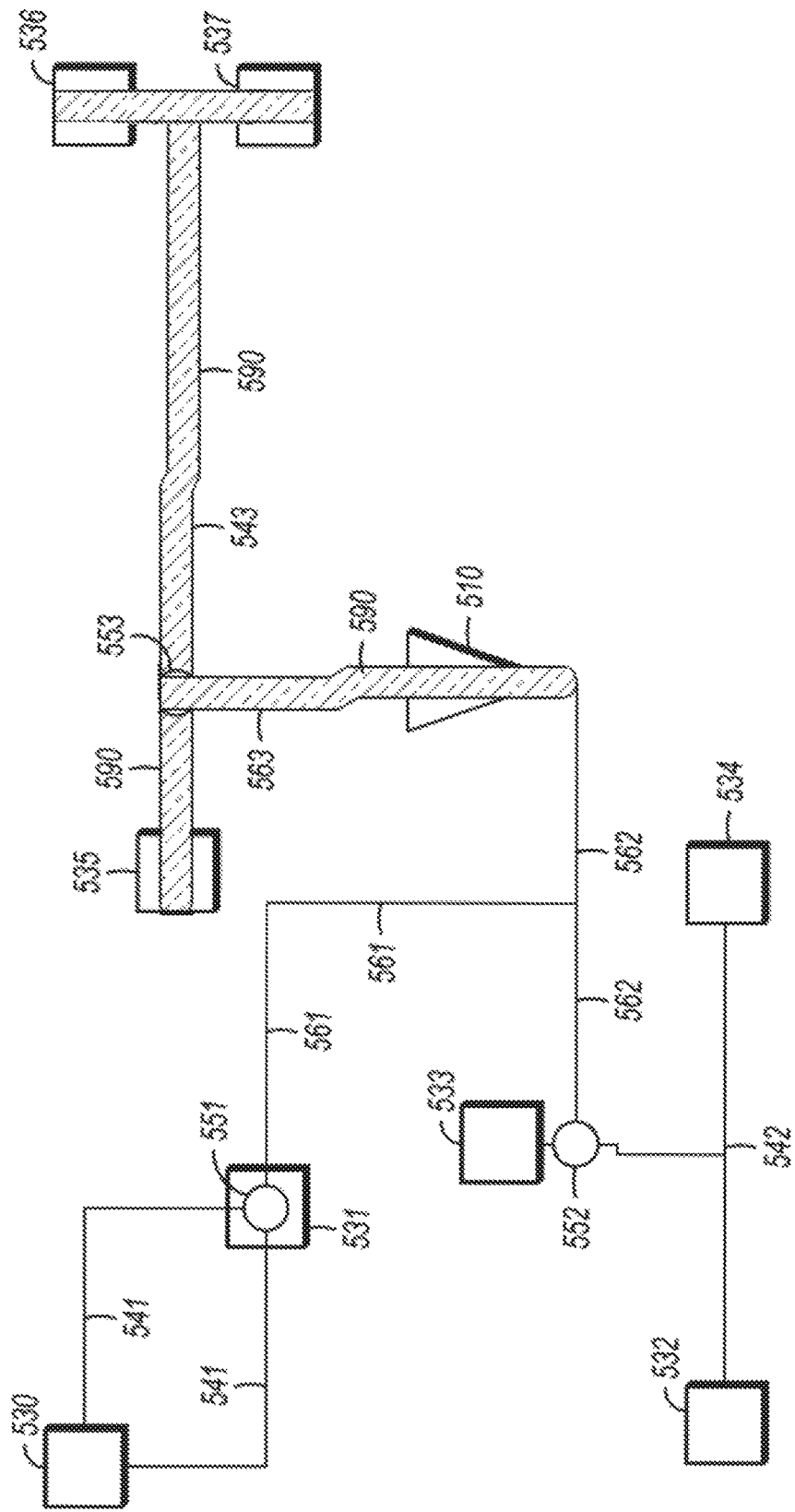
FIG. 5C illustrates aspects of cell placement in a multi-level routing tree in accordance with some embodiments.

FIGS. 5A-C illustrate aspects of cell placement in a multi-level routing tree in accordance with some embodiments. Just as above, FIGS. 5A-C all show three sets of child nodes which are part of a subgraph portion of a circuit design with a single grandparent node. In FIGS. 5A-C, the grandparent node is a grandparent node 510, a first set of child nodes includes child nodes 530 and 531, a second set of child nodes includes child nodes 532-534, and a third set of child nodes includes child nodes 535-537. Each set of child nodes has a corresponding routing subregion 541, 542, and 543, as well as a connecting route 561, 562, and 563, which connects the routing subregion for each set of child nodes from a corresponding connecting point 551, 552, 553 to the grandparent node 510. After the routing subregions and connecting routes are identified, each combination of routing subregion and associated connecting route is identified as a routing region.

FIG. 5A shows a routing region 570 associated with the set of child nodes 530 and 531. FIG. 5B shows a routing region 580 associated with the set of child nodes 532, 533, and 534. FIG. 5C shows a routing region 590 associated with the set of child nodes 535, 536, and 537. Each of these routing regions describes possible placement positions for the parent node for each set of child nodes that will maintain the logical structure illustrated by the subgraph 200 of FIG. 2. For cell placement operations, there are a number of limits (e.g. placement constraints) on the possible placement locations. Such limits may be related to blockages, availability of space, double/triple patterning constraints, or any other such constraints defined for a given circuit design. These routing regions described in FIGS. 5A-C essentially, in some embodiments, provide additional limits on possible locations to test for parent node placement. Sample points that comply with all placement constraints are selected along each routing region 570, 580, and 590, and the sample points are used as test positions for the corresponding parent nodes. For example, in FIG. 5B, the routing region 580 includes the routing lines of the routing subregion 542 and the connecting route 562. In some embodiments, a threshold number of points are selected from these lines. The points may be spaced roughly equidistant from each other in some embodiments. In other embodiments, points may be clustered in various ways based on expected performance (e.g., relative to turns or other nodes). In some embodiments, each point is analyzed using a static timing analysis of the circuit with the parent node placed at the selected sampling point. The point with the operating values associated with the best performance is selected as the placement point for the parent node. This process is then repeated for each routing region. In some systems, routing regions may overlap, as may be seen with the routing region 570 and the routing region 580. In such embodiments, where placement of a parent node in an overlapping region would interfere with the logical relationships between or among nodes (e.g., by changing the relationships between parent nodes), the overlapping portion of the routing regions may be excluded from consideration (e.g., no sampling points from the overlapping area may be considered). In some embodiments, the sampling takes the closest allowable nearby point (e.g. "legal" point or points that comply with all placement constraints) by analyzing the route-region. The system may also consider user constraints beyond placement and static timing analysis constraints. In one embodiment, for example, a user constraint on the maximum routed distance between any two nodes may be considered.

Figure 6:
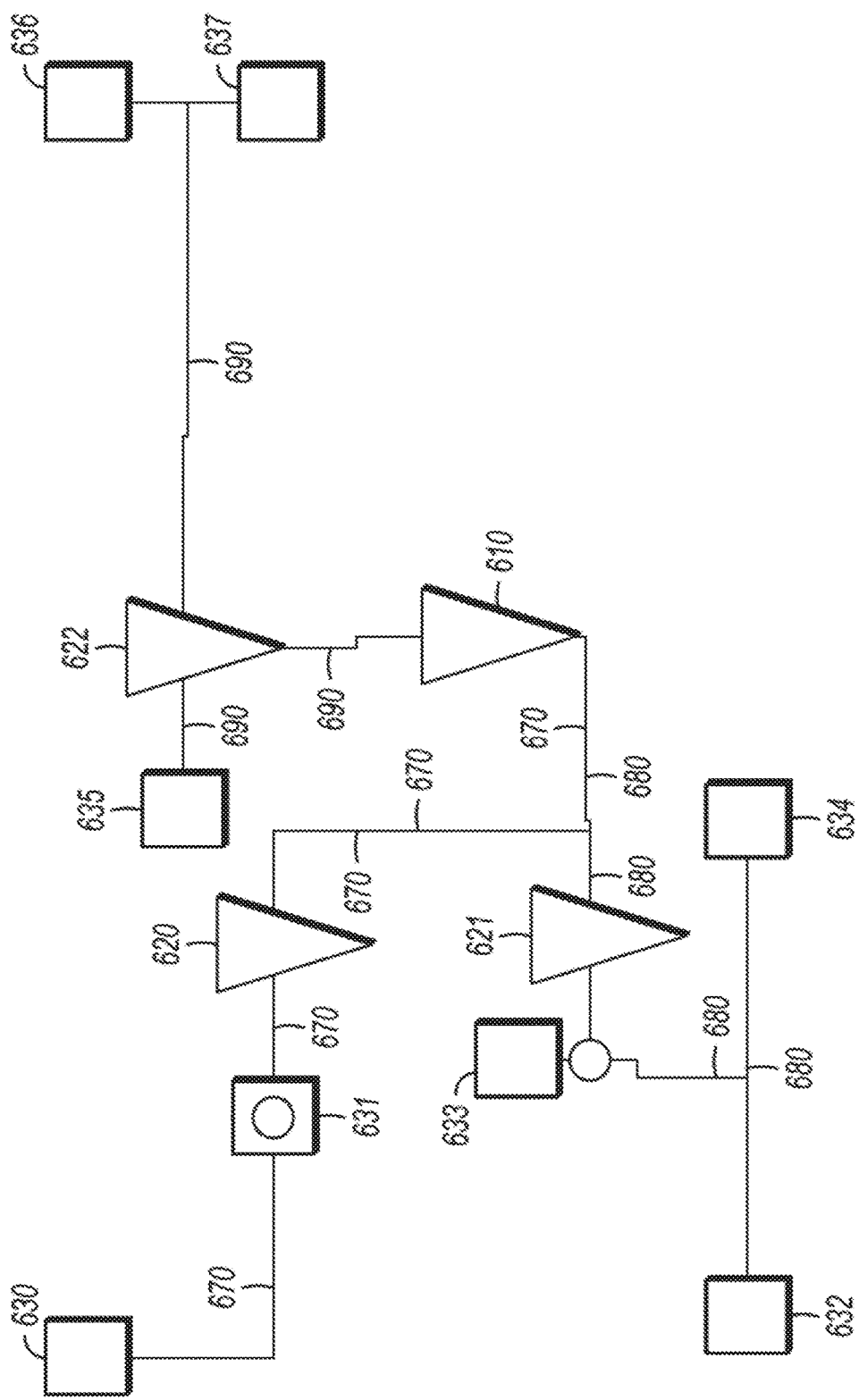
FIG. 6 illustrates aspects of cell placement in a multi-level routing tree in accordance with some embodiments.
Figure 7:
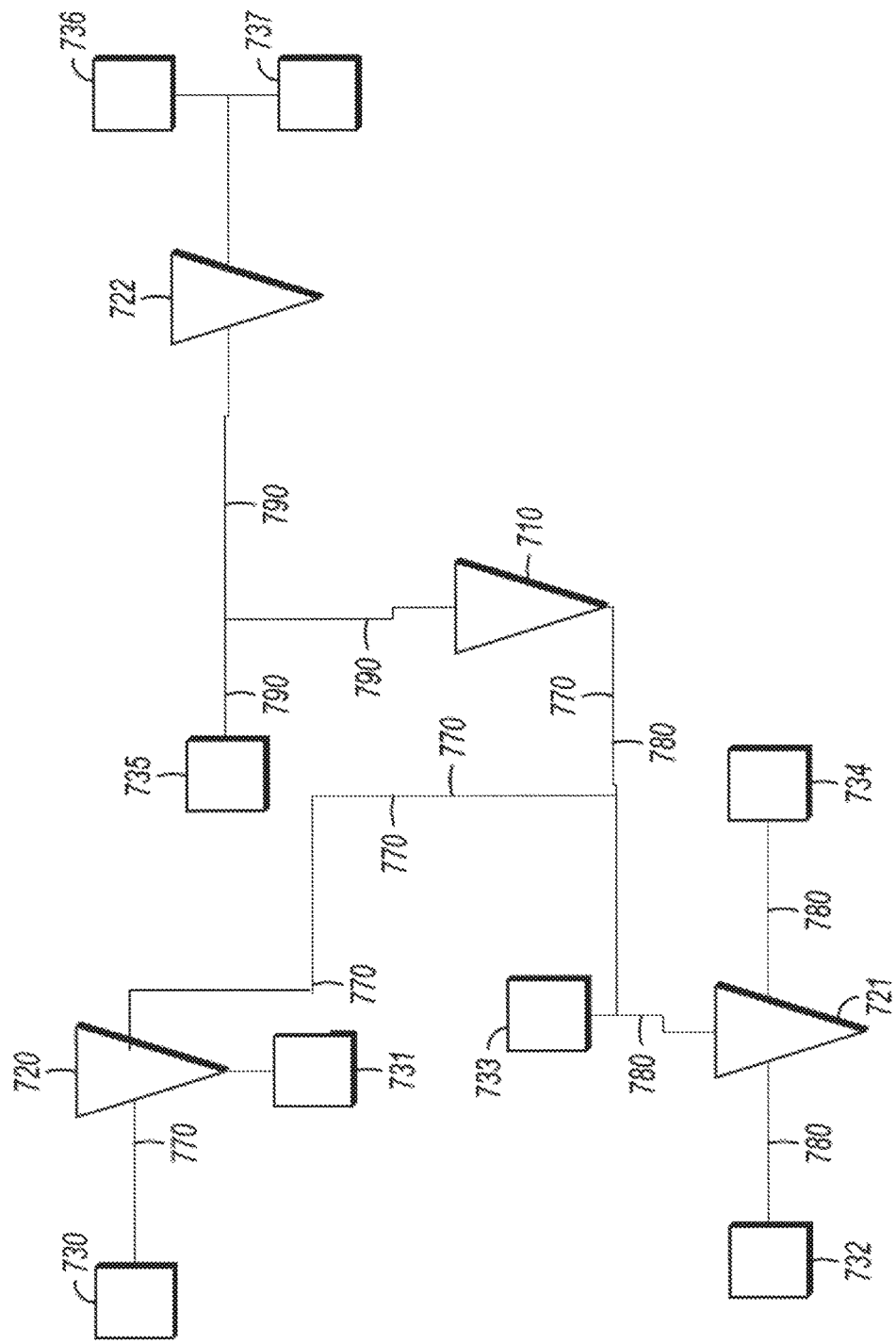
FIG. 7 illustrates aspects of cell placement in a multi-level routing tree in accordance with some embodiments.

FIGS. 6 and 7 illustrate aspects of cell placement in a multi-level routing tree in accordance with some embodiments. FIGS. 6 and 7 each illustrate possible layouts including placement of the parent nodes. As described above, a routing region for each set of child nodes is sampled for possible placement positions of the parent node. Each sample point is tested to determine operating values for that point. Once a point is selected based on the operating values, the design data for a circuit is updated with the placement position for the parent node.

FIG. 6 includes child nodes 630-637 grouped in three sets. Each group of child nodes is associated with a corresponding routing region 670, 680, 690 which connects the group to a grandparent node 610. Within each routing region, a parent node is positioned. Each parent node 620, 621, 622 has a position determined based on the results of static timing analysis for multiple points within the corresponding routing region. The parent node 620 is within the routing region 670, the parent node 621 is within the routing region 680, and the parent node 622 is within the routing region 690. These placement positions maintain the logical ordering seen in the subgraph 200 of FIG. 2. In different embodiments, different operating values may be used to select the exact placement position for each parent node. In some embodiments, total wire capacitance is used as an operating value. In some embodiments, power consumption is used as an operating value. In other embodiments, combinations of such values, or any other performance values determined as part of analysis of a circuit layout, may be used to compare possible placement positions and select the final placement position for each parent node. These operating values may be considered in different ways in different embodiments. In some systems, the wire capacitance "cost" per micrometer of routing may be different above and below a node, with potential design trade-offs. For example, if the cost of routing is lower below the node, the system may seek to increase the wire length below the node while decreasing it above, as long as the total wire capacitance operating value is decreased.

FIG. 7, for example, shows alternative placement positions for parent nodes. Like FIG. 6, FIG. 7 shows child nodes 730-737 grouped in three sets. Each group of child nodes is associated with a corresponding routing region 770, 780, 790 which connects the group to a grandparent node 710. In FIG. 7, parent nodes 720, 721, 722 are shown with different placement positions than the similar parent nodes 620, 621, 622 of FIG. 6. In some embodiments, this may be due to different characteristics of the parent nodes, characteristics of the circuit design, or other inputs that cause the operating values at the different positions to perform differently.

In both FIGS. 6 and 7, after the parent nodes are placed, the routing lines connecting the nodes are set. As part of this process, any areas where multiple equivalent paths between nodes were used are trimmed to one routing path. For example, in FIG. 6, a single line connecting the child nodes 630 and 631 is kept to connect these nodes. Additionally, some rerouting to maintain logical relationships may be performed after the parent node placement is selected. For example, in FIG. 7, the routing path from the grandparent node 710 to the child node 731 is adjusted to maintain the logical relationship given the placement of the parent node 720. The information for these routes and the placement of the nodes is then stored as part of the design data for the circuit design. In various embodiments, once a given subgraph portion of a circuit design is adjusted, the process is repeated for other subgraph portions of the circuit design, until the entire circuit design has been processed or other design criteria or thresholds are met.

Figure 8:
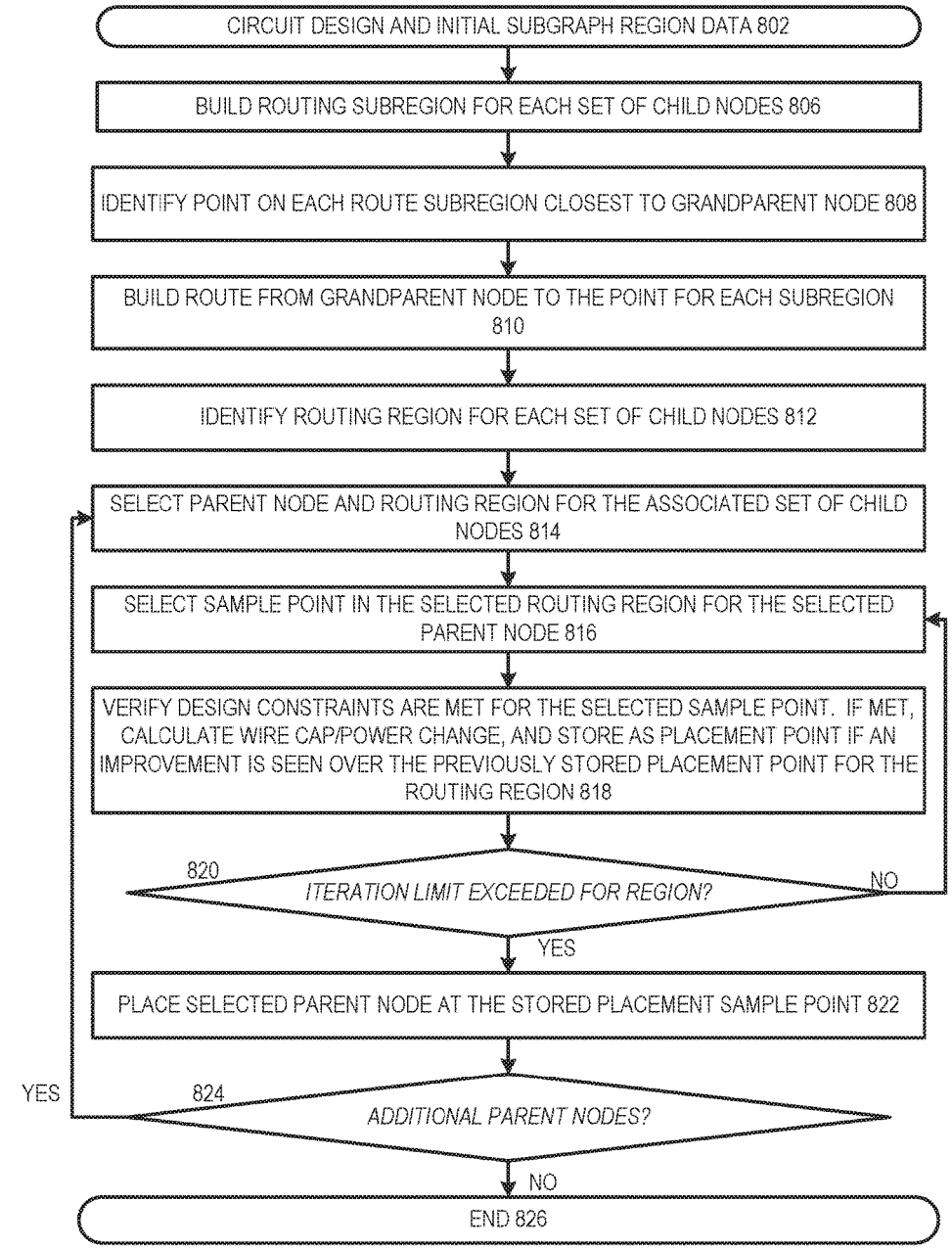
FIG. 8 illustrates a method for placement of cells in a multi-level routing tree in accordance with some embodiments.

FIG. 8 illustrates a method 800 for placement of cells in a multi-level routing tree in accordance with some embodiments. In some embodiments, the method 800 is performed by a computing device with one or more processors. In some embodiments, the method 800 is embodied in computer-readable instructions stored in a non-transitory storage device, such that when the instructions are executed by one or more processors of a device, the device performs the associated method 800.

The method 800 of FIG. 8 begins with operation 802 to access initial design data for a circuit. This includes the subgraph region data which may be extracted from a larger set of circuit data, with the subgraph region data limited to a grandparent node, one or more parent nodes, and at least one set of child nodes. The relationships among the nodes are identified as part of this operation. Additionally, any circuit design data needed to perform static timing analysis is accessed, and position data for placement of the child and grandparent nodes is identified. After the initial data from operation 802 is available, operation 806 continues with building a routing subregion for each set of child nodes. As detailed above, the child node sets are determined by the relationship with an intermediate parent node between the child nodes of a set and a grandparent node. Once the routing subregions connecting child node sets are generated, a connecting point on each routing subregion is identified that is the closest point in the subregion to the grandparent node in operation 808. A route from the connecting point for each subregion to the grandparent node is generated in operation 810, and the route for each subregion is combined with the routing subregion to generate a routing region associated with each set of child nodes in operation 812. Each routing region essentially functions as a space to be analyzed for possible placement of the parent node associated with the set of child nodes that was used for the routing subregion in the given area. As described above, in some embodiments, routing regions may be further modified to remove overlapping areas between different routing regions.

Once the routing region(s) for the subgraph region data are determined, each routing region is considered independently. In operation 814, a parent node and the associated routing region where the parent node is to be placed are selected. In operation 816, a first sampling point within the routing region is selected, and in operation 818, an analysis of the selected sampling point is performed. This analysis includes verifying that design constraints are met for the selected sample point. This may include constraints related to blocking circuit elements, placement limitations for a circuit, or any performance or operational constrains for a given circuit. If a design rule violation is found, then the point is discarded and the method proceeds to operation 820. If the constraints are met, then static timing analysis is performed to calculate operating values such as wire capacitance, power use, or other such values. If the selected point is the first point considered, or if the operating values show an improvement over a previously stored set of values from a previously considered sample point, then the current point is stored as the placement point. After the most recently analyzed point is considered in operation 818, then an iteration limit is checked in operation 820. If the limit has not been reached, then the method 800 returns to operation 816 to select another point within the routing region. If the limit is exceeded, then the method 800 proceeds to operation 822, where the stored point for the given routing region is used as to position the parent node associated with the routing region. In other embodiments, other methods of selecting sampling points to position the parent node may be used. For example, some embodiments may select a number of points and process each point, and then determine whether to process additional points based on performance criteria. For example, performance values determined at selected points may indicate that additional performance improvements may be seen at an additional point between the two points, and may thus suggest consideration of additional points, while other results in other systems may indicate that further consideration of additional points is unnecessary. Different embodiments may thus select points for analysis in different ways.

At operation 824, a test is performed to determine whether additional parent nodes remain to be placed. If additional parent nodes remain to be placed, the method 800 then returns to operation 814, and operates in a loop until each set of child nodes has a placement point selected for the associated parent node. Once all parent nodes are placed, the method 800 ends in operation 826. In some embodiments, if additional subgraph portions of a circuit design are to be analyzed, the method 800 may further loop back to operation 802 to repeat the method 800 for each subgraph region of a circuit design.

The above use of routing regions provides a limit on placement options for parent nodes, particularly when compared with an undirected search method. The use of routes optimized to limit wire length as selection areas to sample when considering placement of parent nodes can significantly reduce the computation cost of finding placement points for parent nodes, with similar results to an undirected search. This benefit is achieved by vastly reducing the number of points to be tried relative to a general grid search, with a corresponding reduction in computation costs. The overall optimizations provide improvements in wire capacitance, power usage, or other operational values while limiting computing resource usage.

Figure 9:
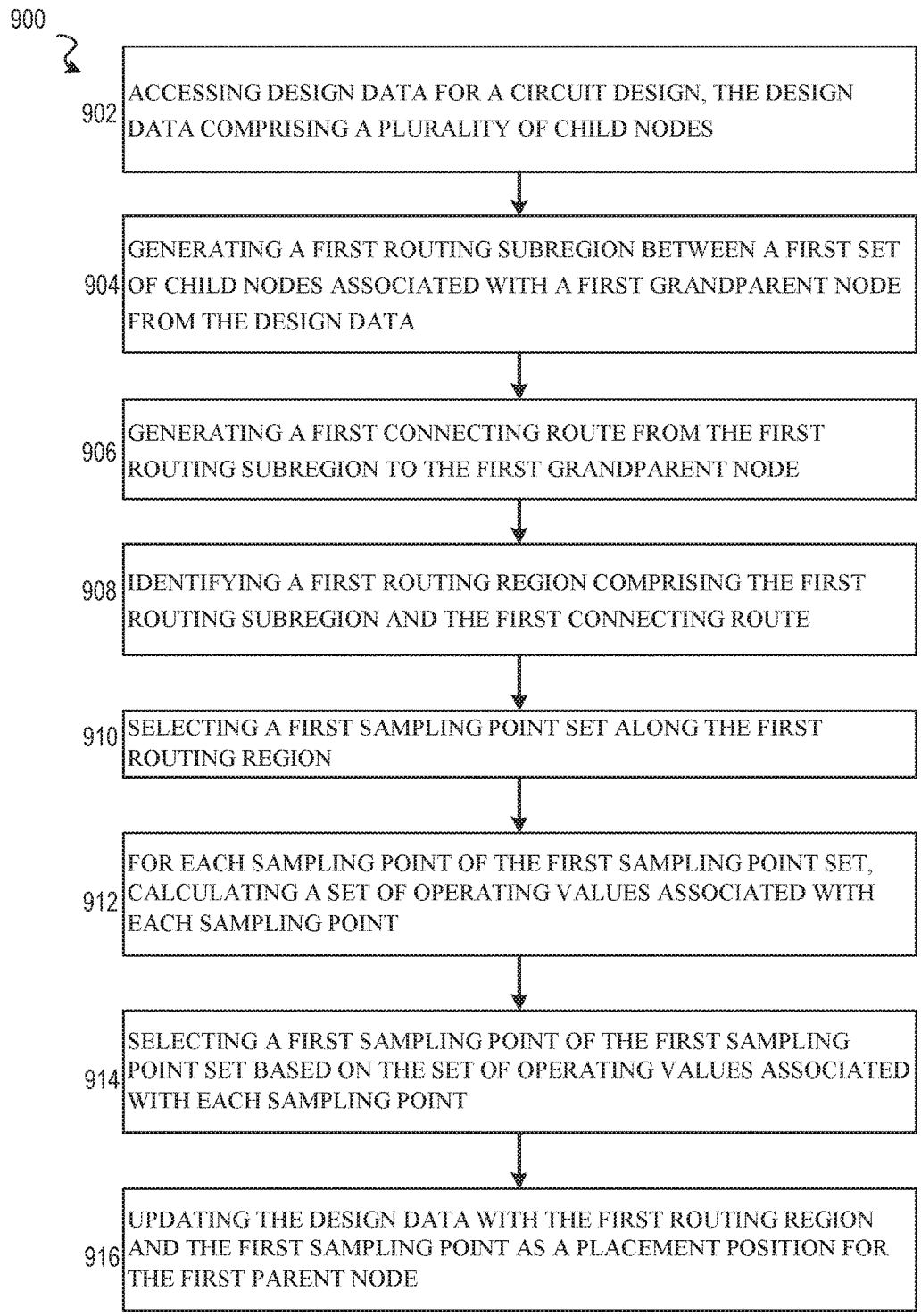
FIG. 9 illustrates a method for placement of cells in a multi-level routing tree in accordance with some embodiments.

FIG. 9 illustrates another method 900 for placement of cells in a multi-level routing tree in accordance with some embodiments. Like the method 800, the method 900 may be implemented in a variety of ways, including as hardware, firmware, instructions in a non-transitory storage medium, or any other such implementation.

The method 900 describes a computerized method for electronic design automation that includes operation 902 of accessing, using one or more hardware processors, design data for a circuit design. The design data includes constraint information and data about the logical relationships of nodes in the design, including details for a plurality of child nodes, one or more parent nodes, and one or more grandparent nodes, and position data for the one or more grandparent nodes and the plurality of child nodes, where the parent nodes are nodes associated with placement between a corresponding child and grandparent node in a routing tree of the circuit design.

After the initial information is accessed in operation 902, a first routing subregion between a first set of child nodes associated with a first grandparent node from the design data is generated in operation 904. This subregion is then connected with the grandparent node by generating, using the one or more hardware processors, a first connecting route from the first routing subregion to the first grandparent node in operation 906. A first routing region comprising the first routing subregion and the first connecting route is then identified in operation 908. The first routing region is used to identify an area for selection of a first sampling point set along the first routing region in operation 910. In operation 912, for each sampling point of the first sampling point set, a set of operating values associated with the sampling point is calculated using the one or more hardware processors. As described above, these operating values may be related to wire capacitance, power consumption, or any other such operating values. In some embodiments, the values are calculated using static timing analysis.

Then, in operation 914, a first sampling point of the first sampling point set is selected based on the set of operating values associated with each sampling point. As part of operation 914, preferable value characteristics are identified. For example, lower wire capacitance and lower power consumption are identified as preferable (e.g., higher performance) in some embodiments, and are selected automatically by the processors executing the method 900. In other embodiments, scoring values based on multiple weighted operating values are used to select the first sampling point from the first sampling point set.

After the first sampling point is selected in operation 914, operation 916 continues with updating, using the one or more hardware processors, the design data with the first routing region and the first sampling point as a placement position for a first parent node. This updated design data may then be used in any aspect of a circuit design flow such as the design flow 100 of FIG. 1. In various embodiments, additional iterations of any aspect of the method 900 may be performed for different sets of child nodes, or different portions of a circuit design (e.g., different subgraph portions of a circuit design).

The above method and similar embodiments described herein can, in certain implementations, use routing to construct minimum wire length connectivity between nodes and to limit placement of other nodes based on these connections. The placement of additional nodes is further optimized by analyzing multiple possible placement points in the limited area in order to pick placement locations to improve performance. This may be done, for example, by picking node locations that minimize wire capacitance or power use while meeting other design constraints. Additionally, in some embodiments, the number of points sampled is further limited based on the routing tree constraints being met within the limited selection area for placement points.

In addition to the above operations of the method 900, additional embodiments may further operate in different ways. In some embodiments, generating the first connecting route comprises identifying a connecting point on the first routing subregion closest to the first grandparent node and generating the first connecting route from the connecting point to the first grandparent node.

In other embodiments, the first routing subregion comprises a first subregion route and a second subregion route, and the first subregion route and the second subregion route are associated with equivalent wire capacitance. Some such embodiments operate where the first sampling point is located on the first subregion route and the second subregion route is excluded from the first routing region in the design data in response to the first sampling point being located on the first subregion route.

In some embodiments, the first sampling point set is selected by dividing a routing region into segments of roughly equal size separated by sampling points. In other embodiments, the first sampling point set comprises a threshold number of sampling points, and selecting the first sampling point comprises calculating the set of operating values for an initial sampling point using static timing analysis; selecting the initial sampling point as the first sampling point; for each remaining sampling point, calculating the set of operating values for the current sampling point using the static timing analysis; and replacing a previous sampling point selected as the first sampling point if the set of operating values for the current sampling point provide greater performance when compared with the set of operating values for the previous sampling point selected as the first sampling point. One such embodiment involves selecting a second sampling point set if no sampling point of the first sampling point set is associated with operating values greater than a design threshold. In further embodiments, additional system-based rules are used to cluster sampling points around areas of expected higher performance.

As part of looped operations performed in some embodiments, the method 900 may continue by generating, using the one or more hardware processors, a second routing subregion between a second set of child nodes associated with a second grandparent node. A second connecting route from the second routing subregion to the second grandparent node is then generated, and a second routing region comprising the second routing subregion and the second connecting route is identified. A second sampling point set is selected along the second routing region, and for each sampling point of the second sampling point set, a second set of operating values associated with the sampling point of the second sampling point set is calculated using the one or more hardware processors. A second sampling point of the second sampling point set is then selected based on the second set of operating values and further used to update the design data with the second routing region and the second sampling point as a placement position for a second parent node.

Another embodiment is a device for generating a circuit design, with the device including a memory and one or more processors. The memory is configured to store design data for a circuit design, the design data comprising a plurality of child nodes, one or more parent nodes, one or more grandparent nodes, and position data for the one or more grandparent nodes and the plurality of child nodes, wherein the parent nodes are nodes associated with placement between a corresponding child and grandparent node in a routing tree of the circuit design. The one or more processors are coupled to the memory and configured to perform operations for updating the circuit design. The operations may include any operations described herein for cell placement. One such embodiment involves generating a first routing subregion between a first set of child nodes associated with a first grandparent node; selecting a point closest to the first grandparent node on the first routing subregion; generating a first connecting route from the point closest to the first grandparent node to the first grandparent node; identifying a first routing region comprising the first routing subregion and the first connecting route; selecting a first sampling point set along the first routing region; for each sampling point of the first sampling point set, calculating a set of operating values associated with the sampling point; selecting a first sampling point of the first sampling point set based on the set of operating values associated with each sampling point; and updating the design data with the first routing region and the first sampling point as a placement position for the first parent node.

As described above, other embodiments may be implemented as a non-transitory computer-readable storage medium comprising instructions that, when executed by one or more processors of a computing device, cause the device to perform operations for electronic design automation. The operations may include operations of any embodiment described herein. One embodiment involves generating a first routing subregion between a first set of child nodes associated with a first grandparent node, generating a first connecting route from the first routing subregion to the first grandparent node, and identifying a first routing region comprising the first routing subregion and the first connecting route.

After the first routing region is identified, a new sampling point is repeatedly selected from a first sampling point set along the first routing region and a static timing analysis is performed for the parent node at the new sampling point to determine a set of operating values for the new sampling point. A first sampling point of the first sampling point set is determined based on the set of operating values associated with each sampling point, and then the design data is updated with the first routing region and the first sampling point as a placement position for the first parent node.

Repeated operations may be performed in various embodiments. In one such embodiment, such repeated operations involve accessing a circuit design comprising the design data, determining a plurality of sets of child nodes, wherein each set of child nodes is connected to a corresponding grandparent node by a corresponding parent node; and generating, for each set of child nodes, a corresponding routing subregion. For each set of child nodes, a corresponding connecting route to the corresponding grandparent node is generated, and used in identifying a corresponding routing region for the set of child nodes comprising the corresponding routing subregion and the corresponding connecting route. Then, for each corresponding routing region, sampling points of the corresponding routing region are selected to select a position for the corresponding parent node based on the operating values of the sampling points of the corresponding routing region. The design data is then updated with the position for the corresponding parent node for each of the sets of child nodes.

Additionally, multiple loops may be performed not only to analyze different placement points in a routing region and different routing regions for different parent nodes, but also to repeat the entire analysis for different portions of a circuit design with more levels. In one such embodiment, operations for cell placement include repeatedly extracting portions of the circuit design comprising corresponding design data for corresponding subgraph portions of the circuit design. For design data for each corresponding subgraph portion of the circuit design, any method above for determining placement positions of nodes within a multi-level routing tree sub-portion of a circuit design is performed.

Further still, for a circuit design including multiple different routing trees, the operations may be performed repeatedly on a circuit design for the different routing trees. Additionally, while particular operations are described above, it will be apparent that operations may be performed in different orders, with repeated operations and/or intervening operations, while still achieving the results described for cell placement in accordance with various different embodiments.

Figure 10:
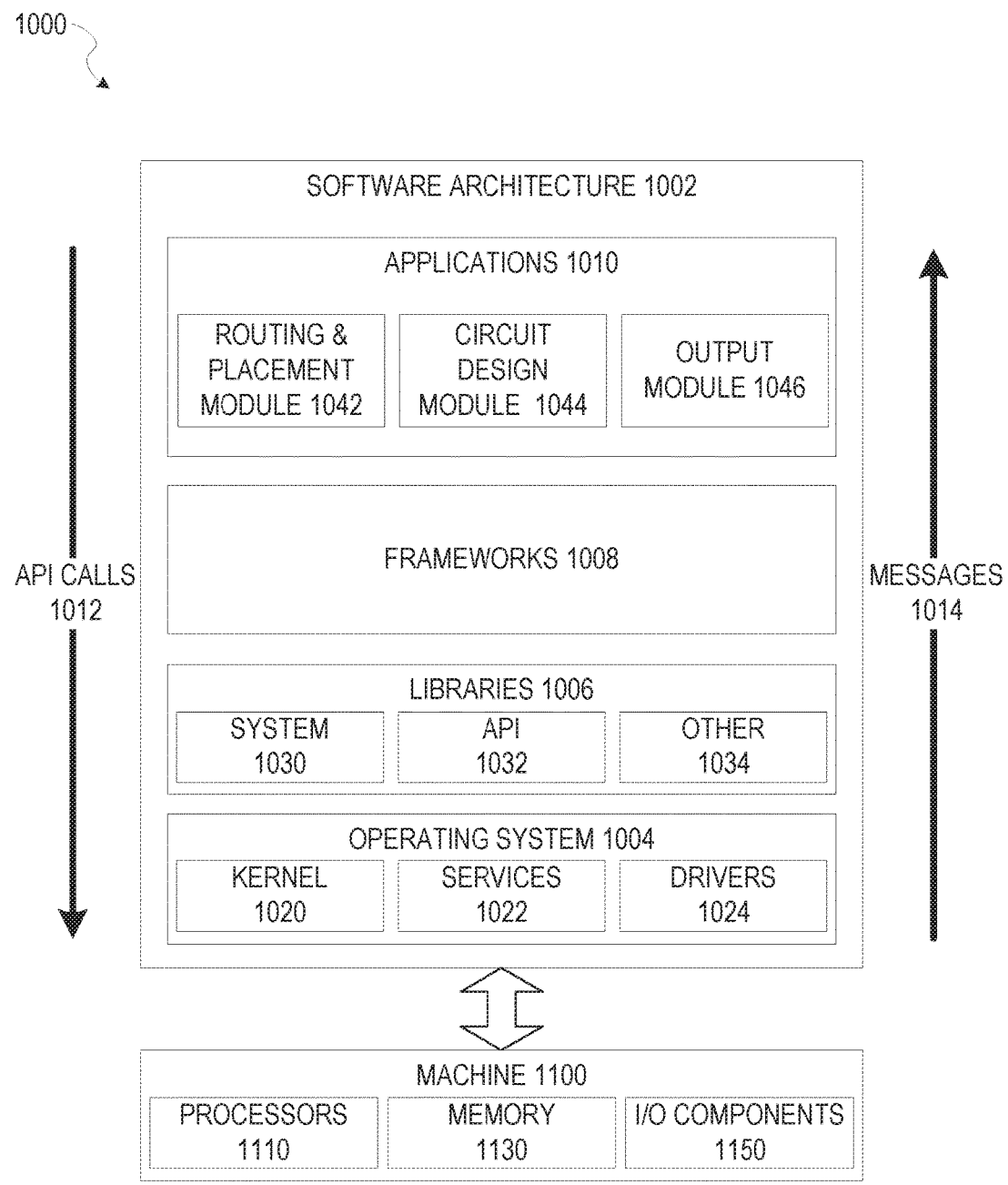
FIG. 10 is a block diagram illustrating an example of a software architecture that may be operating on an electronic design automation (EDA) computer and used with methods for cell placement in a multi-level routing tree according to some example embodiments.

FIG. 10 is a block diagram illustrating an example of a software architecture that may be operating on an electronic design automation (EDA) computer and used with methods for cell placement in a multi-level routing tree according to some example embodiments.

While particular methods and operations are discussed above, it will be apparent that additional intervening or repeated operations are possible within the scope of the various embodiments described herein. Some circuit designs may include multiple wire networks, and the embodiments described herein may be applied to each wire network. Additionally, other embodiments include the above operations performed in a different order or with intervening operations in order to facilitate cell placement in an EDA computing process and environment.

The software architecture 1002 may be operating on an EDA computer and used with methods for cell placement, routing tree generation, and any other circuit design updates and optimization, according to some example embodiments. The software architecture 1002 can be used as an EDA computing device to implement any of the methods described above. Aspects of the software architecture 1002 may, in various embodiments, be used to store circuit designs and execute analysis or optimization in an EDA environment to generate circuit designs, with physical devices generated using these circuit designs.

FIG. 10 is merely a non-limiting example of a software architecture 1002, and it will be appreciated that many other architectures can be implemented to facilitate the functionality described herein. In various embodiments, the software architecture 1002 is implemented by hardware such as a machine 1100 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, software frameworks 1008, and applications 1010. Operationally, the applications 1010 invoke application programming interface (API) calls 1012 through the software stack and receive messages 1014 in response to the API calls 1012, consistent with some embodiments. In various embodiments, any client device, server computer of a server system, or other device described herein may operate using elements of the software architecture 1002. An EDA computing device described herein may additionally be implemented using aspects of the software architecture 1002, with the software architecture 1002 adapted for operating to generate and update cell placement in a routing tree for circuit designs in accordance with embodiments described herein.

In one embodiment, an EDA application of the applications 1010 accesses design data to generate placement data for cells (e.g., nodes) as part of circuit layout that meets design criteria in accordance with embodiments described herein, using various modules within the software architecture 1002. For example, in one embodiment, an EDA computing device similar to the machine 1100 includes the memory 1130 and the one or more processors 1110. The processors 1110 implement a routing and cell placement module 1042 to analyze and update placement of nodes and associated wire connections. The processors 1110 also implement a circuit design module 1044 that uses the routing placement(s) (e.g., wire placement(s)) from the routing and cell placement module 1042 to update a circuit design and perform other EDA operations for generation of a circuit design. In other embodiments, any number of EDA modules may be implemented in conjunction with the functionality of the routing and cell placement module 1042 or integrating the functionality of the routing and cell placement module 1042 to implement cell placement in accordance with various embodiments. An output module 1046 outputs a final circuit design including cell placement for use in generating masks or other outputs as part of production of an integrated circuit. In some embodiments, the output module 1046 may then be used to update a display of the I/O components 1150 of the EDA computing device with data associated with routing placement.

In various other embodiments, rather than being implemented as modules of one or more applications 1010, some or all of the modules 1042, 1044, and 1046 may be implemented using elements of the libraries 1006 or the operating system 1004.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 such as libraries of multi-instance blocks for use in an EDA environment or other libraries that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 may also include other libraries 1034.

The software frameworks 1008 provide a high-level common infrastructure that can be utilized by the applications 1010, according to some embodiments. For example, the software frameworks 1008 provide various graphic user interface (GUI) functions, high-level resource management, high-level location services, and so forth. The software frameworks 1008 can provide a broad spectrum of other APIs that can be utilized by the applications 1010, some of which may be specific to a particular operating system 1004 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files, and viewdefinition files are examples that may operate within a software architecture 1002, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1100 including processors 1110), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1100, but deployed across a number of machines 1100. In some example embodiments, the processors 1110 or processor-implemented modules are located in a single geographic location (e.g., within a home environment, an office environment, or a server farm). In other example embodiments, the processors 1110 or processor-implemented modules are distributed across a number of geographic locations.

Figure 11:
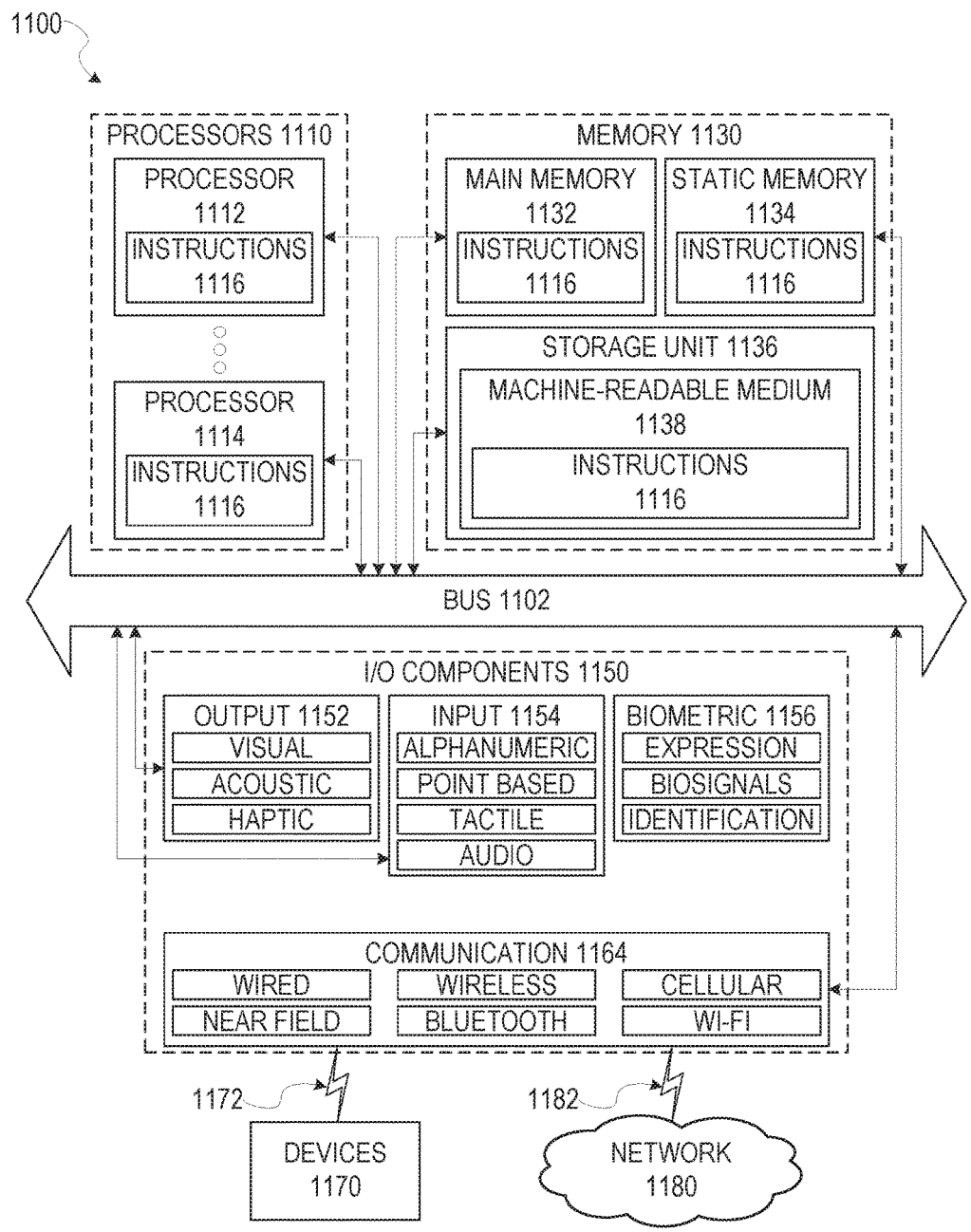
FIG. 11 is a diagrammatic representation of a machine in the form of a computer system within which a set of instructions are executed, causing the machine to perform any one or more of the methodologies discussed herein, according to some example embodiments.

FIG. 11 is a diagrammatic representation of the machine 1100 in the form of a computer system within which a set of instructions may be executed for causing the machine 1100 to perform any one or more of the methodologies discussed herein, according to an example embodiment. FIG. 11 shows components of the machine 1100, which is, according to some embodiments, able to read instructions from a machine-readable medium (e.g., a machine-readable storage medium) and perform any one or more of the methodologies discussed herein. In some embodiments, the machine 1100 may operate with instructions 1116 (e.g., software, a program, an application, an applet, an app, or other executable code) for causing the machine 1100 to perform any one or more of the methodologies discussed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute the instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1110 with a single core, multiple processors 1110 with multiple cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., the instructions 1116) for execution by a machine (e.g., the machine 1100), such that the instructions, when executed by one or more processors of the machine (e.g., the processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like. Biometric components 1156 may also be used as inputs in various embodiments.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, the communication components 1164 include wired communication components, wireless communication components, cellular communication components, near-field communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a USB).

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long-Term Evolution (LTE) standard, others defined by various standard-setting organizations, other long-range protocols, or other data transfer technology.

Furthermore, the machine-readable medium 1138 is non-transitory (in other words, not having any transitory signals) in that it does not embody a propagating signal. However, labeling the machine-readable medium 1138 "non-transitory" should not be construed to mean that the machine-readable medium 1138 is incapable of movement; the machine-readable medium 1138 should be considered as being transportable from one physical location to another. Additionally, since the machine-readable medium 1138 is tangible, the machine-readable medium 1138 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method for electronic design automation, the method comprising:

accessing, using one or more hardware processors, design data for a circuit design, the design data comprising a plurality of child nodes, one or more parent nodes, one or more grandparent nodes, and position data for the one or more grandparent nodes and the plurality of child nodes, wherein the parent nodes are nodes associated with placement between a corresponding child and grandparent node in a routing tree of the circuit design;

generating, using the one or more hardware processors, a first routing subregion between a first set of child nodes associated with a first grandparent node from the design data;

generating, using the one or more hardware processors, a first connecting route from the first routing subregion to the first grandparent node;

identifying, using the one or more hardware processors, a first routing region comprising the first routing subregion and the first connecting route;

selecting, using the one or more hardware processors, a first sampling point set along the first routing region;

for each sampling point of the first sampling point set, calculating a set of operating values associated with the sampling point using the one or more hardware processors;

selecting, by the one or more hardware processors, a first sampling point of the first sampling point set based on the set of operating values associated with each sampling point; and updating, using the one or more hardware processors, the design data with the first routing region and the first sampling point as a placement position for a first parent node of the one or more parent nodes such that the parent node is positioned at the first sampling point.

2. The method of claim 1 wherein generating the first connecting route comprises:
   identifying a connecting point on the first routing subregion closest to the first grandparent node; and
   generating the first connecting route from the connecting point to the first grandparent node.

3. The method of claim 1 wherein the first routing subregion comprises a first subregion route and a second subregion route; and
   wherein the first subregion route and the second subregion route are associated with equivalent wire capacitance.

4. The method of claim 3 wherein the first sampling point is located on the first subregion route; and
   wherein the second subregion route is excluded from the first routing region in the design data in response to the first sampling point being located on the first subregion route.

5. The method of claim 1 wherein the set of operating values comprises a capacitance operating value.

6. The method of claim 5 wherein the first sampling point is selected based on having a lower capacitance operating value than other sampling points of the first sampling point set.

7. The method of claim 1 wherein the set of operating values comprises a power operating value.

8. The method of claim 7 wherein the first sampling point is selected based on having a lower power operating value than other sampling points of the first sampling point set.

9. The method of claim 1 wherein the first sampling point is selected based on a weighted operating score determined at least in part based on a power operating value and a capacitance operating value of the first sampling point.

10. The method of claim 1 wherein the first routing subregion is generated using a Prim-Dijkstra routing.

11. The method of claim 1 wherein the first routing subregion and the first connecting route are generated to minimize wire length in the circuit design.

12. The method of claim 1 wherein the first sampling point set comprises a threshold number of sampling points, and wherein selecting the first sampling point comprises:
   calculating the set of operating values for an initial sampling point using static timing analysis;
   selecting the initial sampling point as the first sampling point;
   for each remaining sampling point, calculating the set of operating values for the current sampling point using the static timing analysis; and
   replacing a previous sampling point selected as the first sampling point if the set of operating values for the current sampling point provides greater performance when compared with the set of operating values for the previous sampling point selected as the first sampling point.

13. The method of claim 12 further comprising:
   selecting a second sampling point set if no sampling point of the first sampling point set is associated with operating values greater than a design threshold.

14. The method of claim 1 further comprising:
   generating, using the one or more hardware processors, a second routing subregion between a second set of child nodes associated with a second grandparent node;
   generating, using the one or more hardware processors, a second connecting route from the second routing subregion to the second grandparent node;
   identifying, using the one or more hardware processors, a second routing region comprising the second routing subregion and the second connecting route;
   selecting, using the one or more hardware processors, a second sampling point set along the second routing region;
   for each sampling point of the second sampling point set, calculating a second set of operating values associated with the sampling point of the second sampling point set using the one or more hardware processors;
   selecting, by the one or more hardware processors, a second sampling point of the second sampling point set based on the second set of operating values; and
   updating, using the one or more hardware processors, the design data with the second routing region and the second sampling point as a placement position for a second parent node.

15. A device for generating a circuit design, comprising:
   a memory configured to store design data for the circuit design, the design data comprising a plurality of child nodes, one or more parent nodes, one or more grandparent nodes, and position data for the one or more grandparent nodes and the plurality of child nodes, wherein the parent nodes are nodes associated with placement between a corresponding child and grandparent node in a routing tree of the circuit design; and
   one or more processors coupled to the memory and configured to perform operations for updating the circuit design by:
   generating a first routing subregion between a first set of child nodes associated with a first grandparent node;
   selecting a point closest to the first grandparent node on the first routing subregion;
   generating a first connecting route from the point closest to the first grandparent node to the first grandparent node;
   identifying a first routing region comprising the first routing subregion and the first connecting route;
   selecting a first sampling point set along the first routing region;
   for each sampling point of the first sampling point set, calculating a set of operating values associated with the sampling point;
   selecting a first sampling point of the first sampling point set based on the set of operating values associated with each sampling point; and
   updating the design data with the first routing region and the first sampling point as a placement position for a first parent node such that the parent node is positioned at the first sampling point.

16. The device of claim 15 wherein the first sampling point is selected based on a weighted operating score determined at least in part based on a power operating value and a capacitance operating value of the first sampling point.

17. A non-transitory computer-readable storage medium comprising instructions that, when executed by one or more processors of a computing device, cause the computing device to perform operations for electronic design automation comprising:
   accessing design data for a circuit design, wherein the design data comprises at least a first parent node logically positioned between at least a first grandparent node and one or more child nodes;

generating a first routing subregion between a first set of child nodes associated with a first grandparent node;

generating a first connecting route from the first routing subregion to the first grandparent node;

identifying a first routing region comprising the first routing subregion and the first connecting route;

repeatedly selecting a new sampling point from a first sampling point set along the first routing region and performing a static timing analysis for a parent node at the new sampling point to determine a set of operating values for the new sampling point;

determining a first sampling point of the first sampling point set based on the set of operating values associated with each sampling point; and updating the design data with the first routing region and the first sampling point as a placement position for a first parent node such that the parent node is positioned at the first sampling point.

18. The non-transitory computer-readable storage medium of claim 17 wherein the set of operating values comprises a capacitance operating value; and
wherein the first sampling point is determined based on having a lower capacitance operating value than other sampling points of the first sampling point set.

19. The non-transitory computer-readable storage medium of claim 17 wherein the instructions further cause the computing device to perform operations comprising:
accessing a circuit design comprising the design data;
determining a plurality of sets of child nodes, wherein each set of child nodes is connected to a corresponding grandparent node by a corresponding parent node;
generating, for each set of child nodes, a corresponding routing subregion;
generating, for each set of child nodes, a corresponding connecting route to the corresponding grandparent node;
identifying a corresponding routing region for each set of child nodes comprising the corresponding routing subregion and the corresponding connecting route;
for each corresponding routing region, selecting sampling points of the corresponding routing region to select a position for the corresponding parent node based on operating values of the sampling points of the corresponding routing region; and
updating the design data with the position for the corresponding parent node for each of the sets of child nodes.

20. The non-transitory computer-readable storage medium of claim 17 wherein the instructions further cause the computing device to perform operations comprising:
selecting a second sampling point set if no sampling point of the first sampling point set is associated with operating values greater than a design threshold;
calculating the set of operating values for each sampling point of the second sampling point set using the static timing analysis; and
selecting the first sampling point from the second sampling point set based on the set of operating values for the first sampling point providing greater performance when compared with the set of operating values for each other sampling point of the first sampling point set and the second sampling point set.

* * * * *